UNITED STATES PATENT OFFICE.

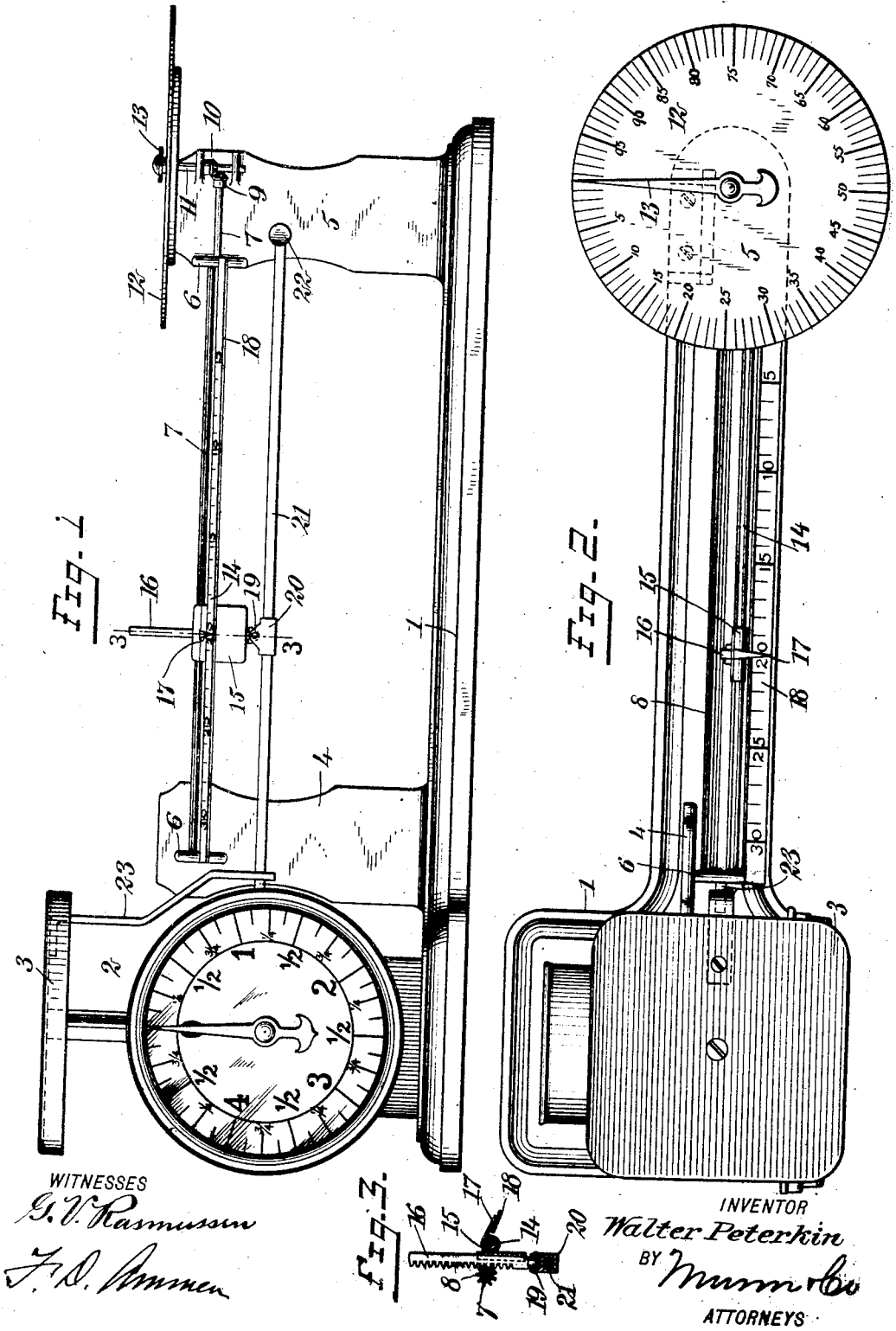

WALTER PETERKIN, OF NEW YORK, N. Y.

COMPUTING-SCALE.

No. 879,795.     Specification of Letters Patent.     Patented Feb. 18, 1908.

Application filed July 20, 1906. Serial No. 327,028.

*To all whom it may concern:*

Be it known that I, WALTER PETERKIN, a citizen of the United States, and a resident of the city of New York, borough of Brooklyn, in the county of Kings and State of New York, have invented a new and Improved Computing-Scale of which the following is a full, clear, and exact description.

This invention relates to computing scales, and the object of the invention is to produce a scale of simple construction which will operate to indicate the cost of any article weighed, at any price per pound.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a front elevation of a scale constructed according to my invention; Fig. 2 is a plan; and Fig. 3 is a detail view, and is a section taken on the line 3—3 of Fig. 1.

Referring more particularly to the parts, 1 represents a base of any suitable form, near one end whereof a weighing scale 2 is provided, the same being of any suitable construction and presenting a plate 3 upon which the article to be weighed is placed, and an indicating dial as shown. The base 1 is preferably of elongated form and is provided with a pair of posts 4 and 5. Near their upper portions the posts 4 and 5 are provided with brackets 6 which support rotatably a gear spindle 7. Between the brackets 6 the spindle 7 is formed with longitudinal grooves as indicated in Fig. 3, so that its surface is fluted or formed with teeth 8 which extend continuously throughout substantially the entire length of the spindle. At the post 5 the gear spindle 7 is extended and provided with a bevel gear 9 which meshes with a similar bevel gear 10, the latter gear being carried upon a vertical arbor 11 of a computing dial 12, the said dial being mounted upon the upper extremity of the post 5 as shown. The arbor 11 projects above the dial 12 and is provided with a hand or pointer 13.

Extending parallel with the gear spindle 7 I provide a guide bar 14, the extremities whereof are mounted in the brackets 6. Slidably mounted on this guide bar 14 there is arranged a shoe 15 as indicated most clearly in Fig. 3; this shoe constitutes a vertical guide for a vertically disposed rack 16, the teeth whereof engage the teeth 8 of the gear spindle 7. This shoe 15 is formed with a pointer 17 which projects laterally so as to lie over a price scale 18, which scale is attached to the brackets 6 and extends longitudinally with the guide bar and the gear spindle as shown. The lower extremity of the rack 16 is attached by a pivot pin 19 to a sliding sleeve 20 which is mounted upon a main lever 21. This main lever extends substantially parallel with the gear spindle 7, and its extremity remote from the scale 2 is preferably attached at 22 to the post 5. Its free extremity is slidably mounted on the lower extremity of a bracket 23 which extends downwardly from the scale pan or plate 3.

The dial of the weighing scale 2 is that of an ordinary weighing scale, with which a pointer coöperates, the said pointer being controlled by the weight on the pan or plate 3. The dial 12 is provided with divisions which indicate cents, the same being numbered 5, 10, 15, 20, etc., having smaller divisions therebetween. The numbers may run to 100, as indicated in Fig. 2, so that a complete revolution of the hand 13 will indicate one dollar.

The price scale 18 is numbered from the right to the left, with numbers such as the numbers 5, 10, 15, etc., which indicate different prices per pound, of provisions which may be weighed upon the scale 2, and these divisions are provided with sub-divisions indicating any intermediate price per pound.

From the construction described, it will be evident that if the scale-plate 3 is depressed, the lever 21 will be depressed, carrying with it the rack 16. The amount of movement of this rack will evidently depend upon the distance it is placed from the fulcrum or pivot point 22 of the lever 21. In other words, the amount of rotation of the gear-spindle 7 depends upon the position of the pointer 17. If this pointer is placed at the division 5 on the price scale, the weight of one pound upon the scale-plate 3 will operate, through the lever 21, the rack 16, the spindle 7 and the bevel gears 9 and 10, to rotate the pointer or hand 13 to the number 5; if the weight upon the plate 3 is two pounds, the hand 13 will move to the number 10, indicating that the cost of the article is ten cents. In every case, the amount of rotation of the hand 13 is proportional to the distance of the pointer 17 from the fulcrum 22, when the computing dial will indicate accurately the cost of any article having a predetermined price per pound.

The pivot pin 19, which connects the rack 16 with the sleeve 20, has its axis disposed in a plane at right angles to the plane in which the lever 21 and the rack lie, so that there is no tendency for the rack to bind in the shoe 15, and there is no tendency for the rack to shift the shoe longitudinally on the guide bar.

While the computing mechanism of the scale is intended primarily to be used in connection with weighing scales, evidently these features may be used in connection with measuring instruments of any kind. In this aspect, the weighing scale may be considered as a measuring device.

The scale described constitutes a convenient counter scale to be used in stores or similar places where small quantities or weights of provisions or materials of any kind are to be sold.

Having thus described my invention, I claim as new and desire to secure by Letters Patent:

1. In combination, a measuring device, a lever adapted to be actuated thereby, a spindle extending longitudinally with respect to said lever, a member connecting said spindle and said lever, adapted to rotate said spindle and having means for adjustment thereupon, and a computing dial actuated by said spindle.

2. In combination, a measuring device, a lever adapted to be actuated by said measuring device, a spindle extending substantially parallel with said lever, a rack connected with said lever and adapted to rotate said spindle, a computing dial, and a hand coöperating with said dial and actuated by said spindle.

3. In combination, a measuring device, a lever actuated by said measuring device, a sleeve slidably mounted on said lever, a rack pivotally attached to said sleeve, a spindle extending longitudinally with said lever and engaging said rack, whereby said rack may rotate said spindle, a computing scale, and a hand carried near the face of said dial and actuated by said spindle.

4. In a computing device, in combination, a computing dial, a spindle adapted to actuate the same, a lever, a member adjustably mounted on said lever and engaging said spindle to rotate the same, and a price scale extending longitudinally of said spindle, and means for indicating the position of said member upon said scale.

5. In a device of the class described, in combination, a weighing scale, a spindle, a guide bar disposed substantially parallel with said spindle, a shoe slidably mounted on said guide bar, a member mounted in said shoe and adapted to rotate said spindle, a lever actuated by said scale, a connection between said member and said lever, a computing dial, and a hand coöperating therewith and actuated by said spindle.

6. In a device of the class described, in combination, a weighing scale, a lever having a fulcrum having its free extremity connected with said scale to be actuated thereby, a spindle extending longitudinally with said lever, a rack engaging said spindle and connected with said lever whereby said lever may rotate said spindle, a price scale extending longitudinally of said spindle and having divisions numbered progressively from said fulcrum toward the free end of said lever, and a computing dial controlled by said spindle.

7. In a device of the class described, in combination, a weighing scale presenting a depressible plate, a lever, a connection between the free end of said lever and said plate whereby a depression of said plate may move said lever, a gear spindle, a rack engaging said spindle and adapted to rotate the same, a sleeve slidably mounted on said lever and having a pivotal connection with said rack, a price scale extending longitudinally of said spindle and having divisions numbered progressively from the fulcrum of said lever toward the free extremity thereof, and a computing dial controlled by said gear spindle.

In testimony whereof I have signed my name to this specification in the presence of two subscribing witnesses.

WALTER PETERKIN.

Witnesses:
F. D. AMMEN,
JNO. M. RITTER.